United States Patent
Liivik et al.

(10) Patent No.: US 10,967,926 B2
(45) Date of Patent: Apr. 6, 2021

(54) OBSTACLE TRAVERSING MOBILE ROBOT

(71) Applicant: Starship Technologies OÜ, Tallinn (EE)

(72) Inventors: Ivo Liivik, Kuusalu (EE); Märt Liivik, Palmse (EE); Tiit Liivik, Kesklinn (EE)

(73) Assignee: Starship Technologies OÜ, Tallinn (EE)

( * ) Notice: Subject to any disclaimer, the term of this patent is extended or adjusted under 35 U.S.C. 154(b) by 250 days.

(21) Appl. No.: 15/953,416

(22) Filed: Apr. 14, 2018

(65) Prior Publication Data
US 2018/0244327 A1  Aug. 30, 2018

Related U.S. Application Data

(63) Continuation of application No. PCT/EP2016/076230, filed on Oct. 31, 2016.

(30) Foreign Application Priority Data

| Nov. 2, 2015 | (EP) | 15192648 |
| Dec. 4, 2015 | (EP) | 15198094 |
| May 25, 2016 | (WO) | PCT/EP2016/025048 |

(51) Int. Cl.
*B25J 5/00* (2006.01)
*B62D 57/024* (2006.01)
(Continued)

(52) U.S. Cl.
CPC ............ *B62D 57/024* (2013.01); *B60B 19/00* (2013.01); *B60G 5/00* (2013.01); *B62D 61/10* (2013.01);
(Continued)

(58) Field of Classification Search
CPC ................................ B25J 5/007; B62D 61/12
(Continued)

(56) References Cited

U.S. PATENT DOCUMENTS

| 3,299,978 A | 1/1967 | Sponsler |
| 3,649,981 A | 3/1972 | Woodworth |

(Continued)

FOREIGN PATENT DOCUMENTS

| WO | WO 2005/051279 A1 | 6/2005 |
| WO | WO 2011/035839 A2 | 3/2011 |
| WO | WO 2017/156586 A1 | 9/2017 |

OTHER PUBLICATIONS

EPO / WIPO, International Search Report, International Application No. PCT/EP2016/076230 (Pub. No. WO/2017/076806), dated May 11, 2017 (4p.).

(Continued)

*Primary Examiner* — Toan C To
(74) *Attorney, Agent, or Firm* — Siritzky Law, PLLC; Brian Siritzky

(57) ABSTRACT

Disclosed is a mobile robot adapted to traverse vertical obstacles. The robot comprises a frame and at least one wheel positioned in a front section of the robot, at least two middle wheels and at least two rear wheels. The at least one middle wheel and at least one rear wheel are connected by a tilting lever that is arranged on each of the opposing sides of or to the frame, forming a pair of wheels. Each tilting lever can be turned around a lever bearing located between the respective axial centers of rotation of each pair of wheels.

20 Claims, 5 Drawing Sheets

(51) Int. Cl.
*B62D 61/10* (2006.01)
*B60G 5/00* (2006.01)
*B60B 19/00* (2006.01)

(52) U.S. Cl.
CPC ..... *B60B 2900/911* (2013.01); *B60G 2300/07* (2013.01); *B60G 2300/20* (2013.01)

(58) Field of Classification Search
USPC ............................... 180/7.1, 8.2, 9.32, 24.02
See application file for complete search history.

(56) References Cited

U.S. PATENT DOCUMENTS

| | | | |
|---|---|---|---|
| 4,166,511 A | | 9/1979 | Stedman |
| 4,621,562 A | * | 11/1986 | Carr ................ B25J 5/007 180/22 |
| 4,817,747 A | | 4/1989 | Kopczynski |
| 4,977,971 A | | 12/1990 | Crane, III |
| 4,993,912 A | | 2/1991 | King et al. |
| 5,248,008 A | | 9/1993 | Clar |
| 5,372,211 A | | 12/1994 | Wilcox et al. |
| 6,112,843 A | * | 9/2000 | Wilcox ................ B60K 17/36 180/209 |
| 6,144,180 A | | 11/2000 | Chen et al. |
| 6,571,892 B2 | | 6/2003 | Kamen et al. |
| 7,150,340 B2 | | 12/2006 | Beck et al. |
| 7,316,405 B2 | | 1/2008 | Kritman et al. |
| 7,426,970 B2 | | 9/2008 | Olsen |
| 7,464,775 B2 | | 12/2008 | Clemens et al. |
| 7,600,592 B2 | | 10/2009 | Goldenberg et al. |
| 7,798,264 B2 | * | 9/2010 | Hutcheson ............ B25J 5/007 180/65.1 |
| 7,894,939 B2 | | 2/2011 | Zini et al. |
| 8,186,463 B2 | * | 5/2012 | Hunziker ............ A61G 5/042 180/65.1 |
| 8,292,007 B2 | | 10/2012 | DeFazio |
| 8,672,065 B2 | | 3/2014 | Beck et al. |
| 8,800,695 B2 | | 8/2014 | Couture |
| 8,839,891 B2 | | 9/2014 | Kaloust et al. |
| 8,851,211 B2 | * | 10/2014 | Schlee ................ B25J 5/007 180/14.1 |
| 8,948,914 B2 | | 2/2015 | Aldo et al. |
| 9,031,692 B2 | | 5/2015 | Dingju |
| 9,244,147 B1 | | 1/2016 | Soundararajan et al. |
| 9,256,852 B1 | | 2/2016 | Myllymaki |
| 9,373,149 B2 | | 6/2016 | Abhyanker |
| 9,459,622 B2 | | 10/2016 | Abhyanker |
| 9,557,740 B2 | | 1/2017 | Crawley |
| 9,561,941 B1 | | 2/2017 | Watts |
| 9,567,005 B1 | | 2/2017 | Kaloust et al. |
| 9,656,805 B1 | | 5/2017 | Evans et al. |
| 9,682,481 B2 | | 6/2017 | Lutz et al. |
| 9,694,976 B1 | | 7/2017 | Wurman et al. |
| 9,786,187 B1 | | 10/2017 | Bar-Zeev et al. |
| 9,844,879 B1 | | 12/2017 | Cousins et al. |
| 10,399,598 B2 | * | 9/2019 | Tanaka ................ B25J 5/007 |
| 2002/0121394 A1 | * | 9/2002 | Kamen ................ A61G 5/061 180/41 |
| 2003/0165373 A1 | | 9/2003 | Felder et al. |
| 2004/0232632 A1 | | 11/2004 | Beck et al. |
| 2005/0023052 A1 | | 2/2005 | Beck et al. |
| 2006/0237239 A1 | | 10/2006 | Bruner et al. |
| 2006/0254840 A1 | | 11/2006 | Strong |
| 2007/0040341 A1 | | 2/2007 | Kaloust |
| 2011/0036650 A1 | | 2/2011 | Simula |
| 2012/0012416 A1 | | 1/2012 | Mirzaie |
| 2012/0090110 A1 | | 4/2012 | Van Den Berg et al. |
| 2012/0304807 A1 | | 12/2012 | Ohruh |
| 2013/0110281 A1 | | 5/2013 | Jones et al. |
| 2013/0332021 A1 | | 10/2013 | Goren |
| 2014/0081445 A1 | | 3/2014 | Villamar |
| 2014/0136414 A1 | | 5/2014 | Abhyanker |
| 2014/0254896 A1 | | 9/2014 | Zhou et al. |
| 2014/0365258 A1 | | 10/2014 | Vestal et al. |
| 2015/0006005 A1 | | 1/2015 | Yu et al. |
| 2015/0045945 A1 | | 2/2015 | Zini et al. |
| 2015/0100152 A1 | | 4/2015 | Trevino et al. |
| 2015/0183581 A1 | | 7/2015 | Worsley |
| 2015/0379468 A1 | | 10/2015 | Harvey |
| 2015/0374564 A1 | * | 12/2015 | Sutton .................... A61G 5/061 280/657 |
| 2016/0200438 A1 | | 7/2016 | Bokeno et al. |
| 2016/0368464 A1 | | 10/2016 | Hassounah |
| 2017/0017237 A1 | | 1/2017 | Tokuyama et al. |
| 2017/0100837 A1 | | 4/2017 | Zevenbergen et al. |
| 2017/0172823 A1 | * | 6/2017 | Ishikawa ............. A61G 5/04 |
| 2017/0220981 A1 | | 8/2017 | Shucker et al. |
| 2017/0364074 A1 | | 10/2017 | Lau et al. |
| 2017/0368684 A1 | | 10/2017 | Zevenbergen et al. |
| 2018/0005169 A1 | | 1/2018 | High et al. |
| 2018/0020896 A1 | | 1/2018 | High et al. |
| 2018/0024554 A1 | | 1/2018 | Brady et al. |

OTHER PUBLICATIONS

EPO / WIPO, Written Opinion of the International Search Authority, International Application No. PCT/EP2016/076230 (Pub. No. WO/2017/076806), dated May 11, 2017 (5p).

EPO / WIPO, International Search Report dated Jan. 30, 2017 in International Application No. PCT/EP2016/074620 [3 pages].

EPO / WIPO, Written Opinion of the International Search Authority dated Apr. 20, 2017 in International Application No. PCT/EP2016/074620 [5 pages].

EPO / WIPO, International Search Report, in PCT/EP2016/076254, dated May 11, 2017.

EPO / WIPO, Written Opinion of the International Search Authority, in PCT/EP2016/076254, dated May 11, 2017.

EPO / WIPO, International Preliminary Report on Patentability Chapter I, International Application No. PCT/EP2016/074620, dated Apr. 17, 2018 [6 pgs.].

Crausaz et al. WO 01/53145 Vehicle for Rugged Terrain, English machine translation, ip.com Jul. 2001.

USPTO, Non-final Office Action for U.S. Appl. No. 15/912,481, dated May 3, 2018.

EPO / WIPO, International Preliminary Report on Patentability Chapter I, International Application No. PCT/EP2016/076230 (Pub. No. WO/2017/076806), dated May 8, 2018 (6p.).

EPO / WIPO, International Preliminary Report on Patentability Chapter I, in International Application No. PCT/EP2016/076254, dated May 8, 2018 [6 pages].

Kückelhaus, Markus et al., DHL Trend Research, "Self-Driving Vehicles in Logistics," Dec. 2014, [downloaded from http://www.dhl.com/content/dam/downloads/g0/about_us/logistics_insights/dhl_self_driving_vehicles.pdf; archived Web version available on https://web.archive.org/web/20151018154844/http://www.dhl.com/content/dam/downloads/g0/about_us/logistics_insights/dhl_self_driving_vehicles.pdf].

* cited by examiner

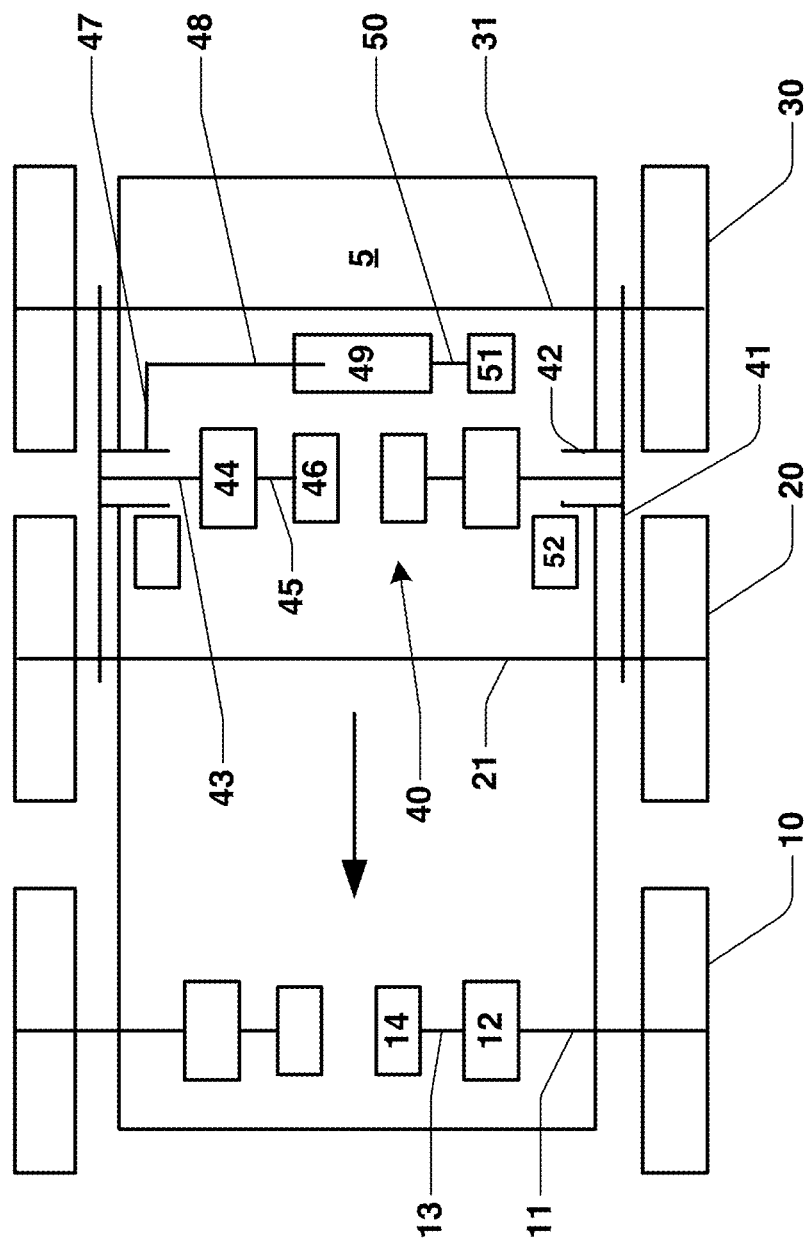

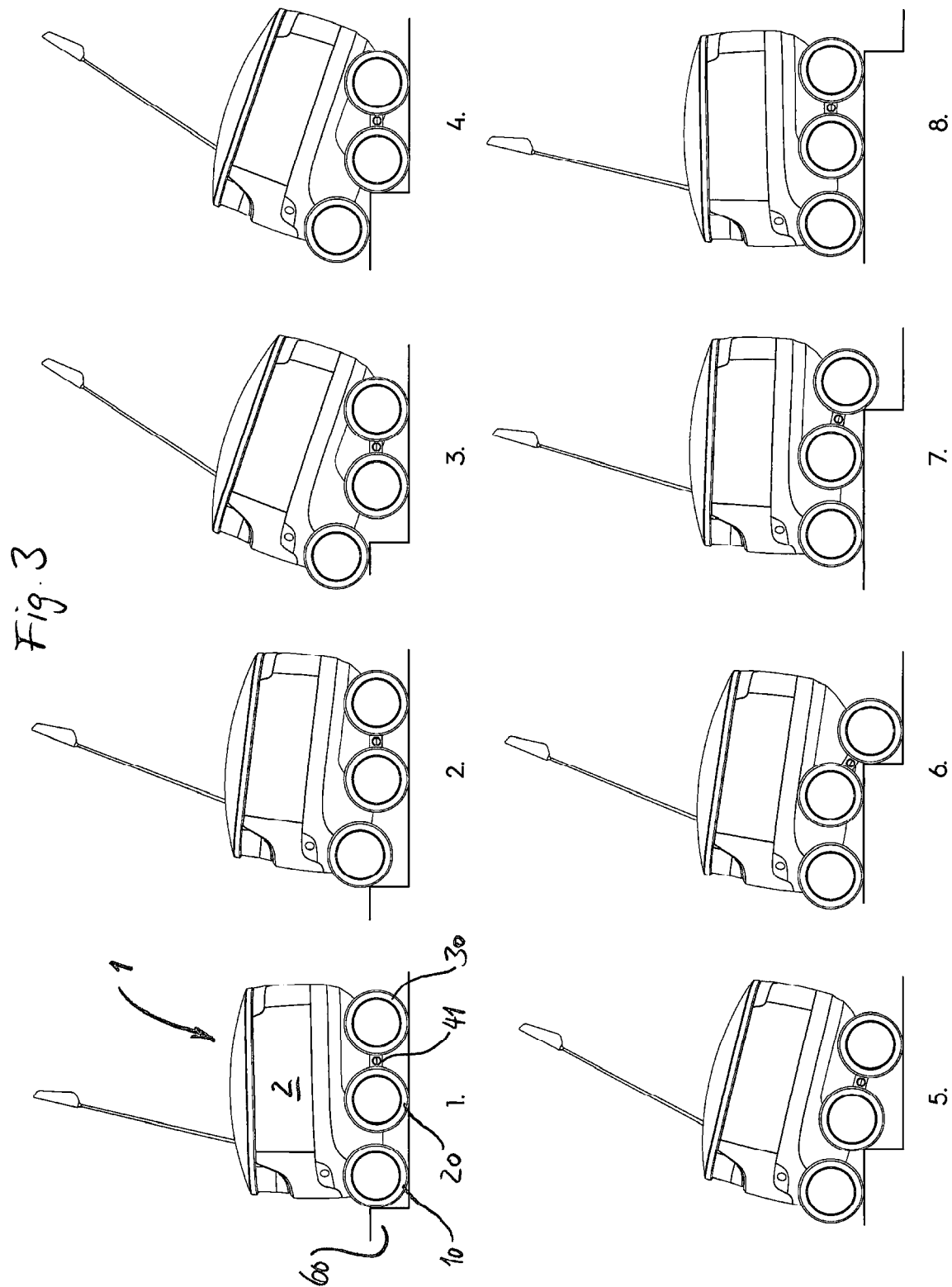

OBSTACLE TRAVERSING MOBILE ROBOT

RELATED APPLICATIONS

This application is a continuation of International Patent Application No. PCT/EP2016/076230, filed Oct. 31, 2016, the entire contents of which are hereby fully incorporated herein by reference for all purposes. Application PCT/EP2016/076230 claims priority from: (i) European Patent Application No. 15192648.2, filed Nov. 2, 2015; (ii) European Patent Application No. 15198094.3, filed Dec. 4, 2015; and (iii) International Patent Application No. PCT/EP2016/025048, filed May 25, 2016, the entire contents of each of which are hereby fully incorporated herein by reference for all purposes.

FIELD

The invention relates to a mobile robot. More particularly, the invention relates to a mobile robot adapted to traverse generally vertical obstacles such as curbstones and the like.

Introduction

Motion in outdoor environment can require traversing obstacles. When moving exclusively on car roads, no major obstacles are traversed. However, movement on pedestrian walkways for example can require crossing car roads, which can require traversing vertical obstacles such as curbstones. Vehicles aiming to travel outdoors, in particular on pedestrian walkways, can comprise a device adapted for climbing vertical obstacles. Such a device can be present for example in wheelchairs, in curb sweeping vehicles, or in off-road vehicles.

U.S. Pat. No. 3,649,981 discloses a road sweeper of the three wheel type having forward and rear traveling wheels and adapted for the climbing of curbs or dividers onto raised surfaces by the provision of lifter wheels bodily movable between raised and lowered positions to elevate the vehicle and its traveling wheels for movement onto and off the raised surface.

U.S. Pat. No. 4,817,747 describes an all-terrain vehicle having six wheels with three wheels on each side. Two of the wheels on each side are mounted on one pivotal bogie, and one wheel is mounted on another pivotal bogie, and the bogies are coupled to each other to always assume the same inclination to the horizontal centerline of the vehicle chassis in all pivotal positions thereof. All wheels are positively driven by gearing which includes gearing in the bogies.

WO patent application 2005/051279 A1 describes an invention related to an electric wheelchair. The inventive wheelchair comprises a frame which is mounted on two drive shafts that are actuated by electric motors, and two climbing mechanisms that tilt in relation to the said shafts. According to the invention, the climbing mechanism enables the chair to move forward horizontally and to be inclined by tilting the mechanism in relation to the drive shaft, thereby raising or lowering same in order to pass over uneven surfaces.

SUMMARY

The present invention is specified in the claims as well as in the below description. Preferred embodiments are particularly specified in the dependent claims and the description of various embodiments.

The present invention is directed to a mobile robot. The robot can particularly drive autonomously and/or semi-autonomously. It can be adapted to traverse at least generally vertical or vertical obstacles, such as curbstones. It will be understood that also in one, two and/or three dimension(s) inclined obstacles or bumps can be traversed.

A robot according to the present invention can be a machine, device, unit, assembly, system etc. being able to carry out a series of actions automatically and may further be programmable by respective computing hardware and software. One of the actions can be driving, particularly in autonomous and/or semi-autonomous fashion. Semi-autonomous operation of the robot can mean that a third party, such as an operator, can control the robot by providing commands to the robot to direct the robot along a path, for example when traversing vertical obstacles. The operator can further communicate with people in the immediate proximity of the robot through the microphone and speakers that can be mounted on the robot.

The robot can comprise a frame structure or undercarriage having a front end and a back end, and further having a front section, a middle section and a back section. The robot can comprise at least one front wheel positioned in the front section of the robot and extending beyond it in the front. Further, it can comprise at least one back wheel positioned in the back section of the robot, and at least one middle wheel positioned in the middle section of the robot. Moreover, at least one further wheel positioned either near the front, middle and/or back of the structure can be provided, particularly in order to prevent any severe tilting to the side.

The robot can further comprise a motor-driven device for exerting a downward and/or an upward force with respect to the ground, selectively on the at least one middle wheel. The robot can comprise at least two motors, each of which can be adapted to drive the wheels and/or the motor-driven device.

The robot can comprise also more than the at least four wheels as specified before. E.g., it can comprise 6 wheels with a pair of wheels in the front, one pair in the middle and one pair in the rear. However, this is not necessary in order to fulfill the invention, as will be further understood from the following.

The motor-driven device is adapted so that when the robot encounters a vertical obstacle along its direction of movement, a downward and/or upward force can be applied by the motor-driven device through the at least one middle wheel, to facilitate the traversal of the vehicle across the vertical obstacle. In case of a pair of middle wheels or more than that, these wheels can be moved downwardly and/or upwardly. This can be done by any mechanism.

The motor-driven device can be adapted to provide a downward and/or upward force through at least one middle wheel that can be located behind (towards the rear) of the center of mass of the robot.

The motor-driven device can further be adapted to exert a downward and/or upward force through the at least one back wheel. In case the robot is driving over ground or traversing an obstacle, the downward movement of the middle wheel(s) makes the robot tilt around a tilting axis that can be perpendicular to the direction of driving. The front wheel(s) and/or back wheel(s) can further assist this. When the front wheel(s) touch the vertical or inclined surface of the obstacle its/their traction applied to this surface can help the robot to climb the obstacle. Preferably, the middle wheel(s) and/or the rear wheel(s) assist the front wheel(s) to maintain touch with this surface. The middle wheel(s) and their relative movement further assist to allow the front wheel and the robot to climb the obstacle and/or to keep the traction of the front wheel(s) on top and/or behind the obstacle. This will be further described below.

The robot can further comprise a sensing device for sensing obstacles along its forward direction of motion. The sensing device comprises at least one of: ultrasonic sensor, Lidar sensor, optical flow sensor, stereo vision sensor, map-based localization device, bumping sensor, odometry-based sensor and wheel slippage sensor. Also a wheel-based model inter alia taking into consideration the driving but lack of turning of the wheels can be used.

The sensing device can be adapted to trigger the motor-driven device such that a downward force is applied to at least the middle wheels of the robot to facilitate the movement of the front wheels across the obstacles.

The motor-driven device can be further adapted to communicate with the sensing device and apply a downward and/or upward force on at least the middle wheels based on information from the sensing device.

The motor-driven device can be adapted to alternately apply downward force to the middle wheels and the back wheels based on information from the sensing device.

The sensing device can comprise means for communicating with a central processing unit, wherein the central processing unit provides instructions to the motor-driven device based on information received from the sensing device.

At least one tilting lever (tilting shaft) can be provided connecting at least one middle and one back wheel, preferably two shafts connecting middle and back wheels on each of the left and the right sides of the robot.

The tilting lever can be adapted for at least angular motion in the plane of the robot's wheels in order to apply a downward and/or upward force with respect to the ground.

The robot can further comprise at least two middle wheels and two back wheels, wherein the motor-driven device comprises a motor and two tilting levers and wherein one set of wheels comprising at least one middle wheel and a back wheel is connected to a first tilting lever, and a second set of at least one middle wheel and a back wheel is connected to a second shaft, and wherein the first and second tilting levers are connected to a rear axle at a first and second pivot point on the first and second tilting levers, respectively.

The tilting lever can rotate freely and/or be actuated by a motor. The tilting shaft can rotate around a lever bearing (tilting axle) that can be located between the respective axial centers of rotation of each pair of wheels.

Opposing wheels can also be arranged without being connected to each other but to the neighboring wheels by the tilting lever. In this case a lever turning motor can be arranged for each side of the robot, e.g. tilting the middle wheel and the rear wheel on the same side and assisting climbing.

The tilting lever can rotate or be rotated around the lever bearing by at most 60°, preferably on either side, i.e. clockwise and counter clockwise. More preferably, the tilting lever can be turned around the lever bearing by at most 55°, preferably on either side. More preferably, the tilting lever can be turned around the lever bearing by at most 50°, preferably on either side. More preferably, the tilting lever can be turned around the lever bearing by at most 45°, preferably on either side. More preferably, the tilting lever can be turned around the lever bearing by at most 40°, preferably on either side. More preferably, the tilting lever can be turned around the lever bearing by at most 35°, preferably on either side. More preferably, the tilting lever can be turned around the lever bearing by at most 30°, preferably on either side. More preferably, the tilting lever can be turned around the lever bearing by at most 25°, preferably on either side. More preferably, the tilting lever can be turned around the lever bearing by at most 20°, preferably on either side.

Accordingly, the invention also provides a robot comprising a frame with at least one front wheel, at least two middle wheels and at least two rear wheels, wherein at least one middle wheel and at least one rear wheel are connected by a tilting lever that is arranged on each of opposing sides of the frame; and wherein each tilting lever can be turned around a lever bearing located between the respective axial centers of rotation of each pair of wheels. There can be one pair of middle of back wheels that are arranged on one tilting lever that is arranged on one side of the frame, and another pair of middle and back wheels that are arranged on a second tilting lever that is arranged on or to an opposing side of the frame. The tilting levers can be connected to respective lever shafts via a lever bearing.

The tilting levers on each side can rotate freely and/or can be actuated independently by at least one lever turn motor. During free rotation the motor can be in an unactuated state, thereby damping the tilting of the tilting lever by its resistance. Alternatively or additionally a clutch can be arranged, disconnecting the lever turn motor from the respective turning lever so that tilting can take place without any or less resistance, particularly when the robot is moving and the respective middle wheel and connected rear wheel can tilt according to the topography of the ground.

For example, the clutch can be controlled so as to leave the lever turn motor disconnected when not traversing difficult and/or vertical obstacles, and connect the motor when needed to traverse such obstacles.

The tilting lever would be useful for robot balance and for minimizing vibration and reducing wear during the motion of the robot, for example when the robot is moving across an uneven terrain. The tilting levers can also facilitate increased traction, by ensuring that the wheels touch ground when traversing uneven surfaces. Further, when the robot is equipped with cameras for visualization purposes, increased stability is beneficial. The tilting levers on either side of the robot can also move independently, either when the tilting levers move freely around the lever bearing or when the tilting levers are rotated by means of a motor. This way, the configuration of the tilting lever on either side may be different during operation of the robot.

The robot may further comprise at least one sensor (52, FIG. 2) adapted to sense the absolute and/or relative angular position of the tilting lever. This sensor can preferably be a Hall Effect non-contact rotary position sensor. The sensor can also be any one or a combination of at least one potentiometer, at least one optical encoder, at least one magnetic encoder and/or at least one visual camera-like system.

The sensor adapted to sense the relative angular position of the tilting lever can be calibrated at the beginning of robot operation, or during setup of the robot, preferably by moving the lever to an extreme position and by calibrating it there. The sensor can be recalibrated whenever deemed desirable, such as daily, more preferably weekly, more preferably monthly. In a preferred embodiment, the calibration process can be automated and performed by the robot itself as part of a diagnostics program.

In another embodiment, the tilting lever can be actuated by a motor. The motor can engage right from the start of desired rotation of the tilting lever or after the tilting angle reaches a certain value. This value can depend on the precise task the robot is accomplishing. The motor can engage after receiving particular sensor data from the sensor adapted to sense the angular position of the tilting lever.

In a preferred embodiment, the robot can be adapted to climb obstacles of up to 5 cm, more preferably up to 8 cm, more preferably up to 10 cm, even more preferably up to 15 cm, even more preferably up to 18 cm, or even more preferably up to 20 cm, with or without engaging a motor driving the tilting lever.

In a preferred embodiment, the tilting lever can be adapted to rotate freely until a certain angle, at which point the tilting turn motor is adapted to engage. The tilting turn motor can be adapted to engage after the tilting lever has rotated freely for at least 10°, more preferably such as at least 15°, more preferably such as at least 20° and even more preferably such as at least 25°.

In a preferred embodiment, the tilting lever can be adapted to rotate freely over a range of 25°-45° from one engagement point to the next. In such an embodiment, the tilting turn motor can be adapted to engage or to start actuating when the tilting lever reaches an engagement point.

In one embodiment, the robot can be adapted to move over uneven ground without engaging the lever turn motor, i.e. simply by rotating the tilting lever freely. Uneven ground can refer to any surface comprising bumps or holes, such as a walkway comprising cobblestones, low kerbstones or curbstones, ground comprising plants or stones or rocks, concrete with indentations in the surface and other features leading to departures from a smooth surface.

The motor-driven device can be adapted for exerting angular force on the first and second tilting lever about the first and second pivot points, so as to alternately generate a downward force on the middle wheels and the back wheels.

The motor-driven device can be further adapted to lift the middle wheels, so that during climbing, their rotational center transiently extends vertically beyond that of the front wheels', with respect to the vehicle frame or undercarriage.

The motors driving the wheels can be electrical motors. Any kind of electrical motors known in the art for driving purposes can be used.

The front wheels can be driven. More preferably all of the wheels can be driven.

The motor-driven device can comprise at least one piston-driven device adapted to drive at least one wheel in a vertical direction with respect to the ground.

The motor-driven device can comprise two piston-driven devices for driving the middle wheels in a vertical direction with respect to ground.

The robot can comprise at least 4 (four) electric motors adapted to drive the wheels, such as with two motors for driving each of the two front wheels and two motors for driving two sets of middle and back wheels, each of said motors driving at least one middle wheel and a back wheel that is disposed along one side of the robot.

The robot's center of mass can be located between the middle and the front end of the robot. The robot's center of mass can be located between the middle of the robot and half of the distance from the middle to the front end of the robot. The center of mass can also comprise any delivery the robot may transport.

The robot can be adapted for motion in an unstructured outdoor environment. The robot can be adapted to traverse vertical obstacles of a height of about 10 to about 25 cm, such as about 15 to about 20 cm, such as curbstones.

In the present context, a wheel includes tires that are mounted thereon, preferably on the outer rim.

The wheel diameter of a robot can amount to 10-30 cm, preferably 15-25 cm, more preferably about 20 cm. Generally, the invention can be realized using combinations of wheels that are of different diameters. The wheels of the robot are in one embodiment of similar dimensions. The wheels can also be of substantially identical diameter.

The front wheels can protrude in front of the frame structure by 1 to 8 cm, preferably by 1 to 6 cm, more preferably by 2 to 5 cm.

The wheels can protrude beneath the frame by at least 5 cm, preferably at least 6 cm, more preferably by at least 7 cm.

The wheels can comprise pneumatic tires, for example tires made of a natural rubber or caoutchouc compound and/or synthetic rubber. The wheels can also comprise solid tires. Synthetic rubber can be any suitable artificial elastomer, such as those synthesized from petroleum byproducts. Examples of synthetic rubber include styrene-butadiene rubbers, which are made from styrene and butadiene. Other synthetic rubbers can be made from isoprene, chloroprene and/or isobutylene monomers, and can also include isoprene for crosslinking. The wheels can also comprise silicon tires.

The tires can be essentially smooth, or the tires can be grooved, symmetrically or asymmetrically. The grooves can be of any suitable depth and orientation, as known to the skilled person. The tires can be studded. It can also be convenient to change the type of tire depending on the season or the terrain in which the robot is operating.

The wheels can have a static friction coefficient $\mu_s$ between the wheels and the obstacle is 0.9-1.1 for dry surface and 0.2-0.4 for wet surface.

The front wheel(s), the back wheel(s) and the center wheel(s) can be arranged in an undercarriage or frame structure such that the robot is supported by at least two wheels during normal travel along a surface.

The robot can further comprise an enclosed space for holding at least one delivery, preferably comprising a secure access device for providing access to the space. The secure access device comprises a closure mechanism and/or a lid that is controlled by a secure interface.

With a delivery comprised within the robot, the center of mass of the combination can be located between the middle and the front end of the robot.

The robot can be adapted to traverse at least vertical obstacles, the robot comprising a frame structure having a front end and a back end, the robot comprising at least one pair of front wheels positioned in proximity of the front end of the structure, at least one pair of back wheels positioned towards the back end of the structure and at least one pair of middle wheels positioned in between the front and back wheels. Moreover, at least two motors are provided that are adapted to drive the wheels. At least one pushing device for exerting a downward force with respect to the ground, selectively on the at least one middle wheel can be further provided.

A motor, preferably an electrical motor, can drive the pushing device. The pushing device can be adapted such that when the robot encounters a vertical obstacle along its direction of movement, the device actuates at least one pair of middle wheels, to facilitate the traversal of the vehicle across the vertical obstacle, by applying a downward and/or upward force on the middle wheels.

The pushing device can be further adapted to exert a downward and/or upward force through at least one pair of back wheels.

The motor-driven device and/or the pushing device can exert counteracting force on the middle and back wheels, so that when a downward force is applied to the middle wheels, a counteracting upward force is simultaneously applied to the back wheels, and when an upward force is applied to the middle wheels, a counteracting downward force is simultaneously applied to the back wheels. The force that is applied to the wheels by the pushing device can be equal in magnitude.

The robot can comprise a sensing device for sensing obstacles along its forward direction of motion.

The sensing device can be adapted to trigger the pushing device such that a downward force is applied to at least the pair of middle wheels of the robot to facilitate the movement of the front wheels over the obstacles.

The sensing device can comprise at least one of: ultrasonic sensor, Lidar sensor, optical flow sensor, stereo vision sensor, map-based localization device, bumping sensor, odometry-based sensor and wheel slippage sensor.

The pushing device can be further adapted to communicate with the sensing device and apply a downward and/or upward force on the middle wheels based on information or instructions from the sensing device.

The pushing device can comprise at least one tilting lever connecting at least one middle and one back wheel, preferably two shafts connecting middle and back wheels on each of the left and the right sides of the robot.

The pushing device can be adapted to alternately apply force to the middle wheels and the back wheels based on information from the sensing device.

The sensing device can comprise means for communicating with a central processing unit, and wherein the central processing unit provides instructions to the pushing device based on information received from the sensing device.

The tilting lever can be adapted for at least angular motion in the plane of the robot's wheels in order to apply a downward and/or upward force with respect to the ground.

The pushing device can comprise a motor, and wherein the first and second tilting levers are connected to a rear axle at a first and second pivot point on the first and second axles, respectively.

The pushing device can be adapted for exerting angular force on first and second shafts about the first and second pivot points, so as to alternately generate a downward force on the middle wheels and the back wheels.

The middle and/or back wheels can, during climbing transiently be displaced towards or away from the body of the robot. Consider for example the robot starting to climb an obstacle. The front wheels start climbing up the obstacle, which means that the body of the robot is now tilted with respect to the ground on which the middle and back wheels rest. As a consequence of the middle and back wheels being connected on tilting levers that are mounted on an axis, the middle wheel will move away from the body, while the back wheel will move towards the body. As the middle wheels start to move up the obstacle, the relative position of the middle and back wheels with respect to the body will be reversed, i.e. the middle wheels will move towards the body, and the back wheels away from the body. Accordingly, the pushing device can be adapted to lift the middle wheels, so that during climbing, their rotational center can transiently extend vertically beyond that of the front wheels', with respect to the vehicle frame. For example, if the wheels are of similar or identical diameter, the center of the middle wheels will extend vertically beyond that of the front wheels, to maintain contact with the obstacle being climbed during the climbing. At the same time, the rear wheels can be moved away from the body which further supports the moving of the robot's front upwardly.

A mobile robot can be further adapted to traverse vertical obstacles with a predefined height. The robot can comprise a frame structure having a front end and a back end, the robot comprising at least one pair of front wheels positioned in proximity of the front end of the structure, at least one pair of back wheels positioned towards the back end of the structure and at least one pair of middle wheels positioned in between the front and back wheels. In one embodiment, the wheels of the robot have radius r. The maximum allowable distance between the front and middle wheels can be described by the equation:

$$d = \frac{6r^2 - 3h \cdot r}{2(h-r)},$$

where d is the said maximum distance, r is the radius of the wheel and h is the predefined height of the vertical obstacle. Accordingly, in one embodiment, the wheels of the robot have a radius r and the robot can further be characterized by a maximum distance d between the at least one front wheel and the at least one middle wheel measured from the rear-most facing point of the at least one front wheel to the front-most facing point of the at least one middle wheel of:

$$d' = \frac{6r^2 - 3h' \cdot r}{2(h'-r)},$$

where d is the said maximum distance, r is the radius of the wheel and h is the predefined height of the vertical obstacle.

The frame structure can comprise an undercarriage that is structured so as to be in vertical proximity of a line connecting the rear-most facing point of the at least one front wheel to the front-most facing point of the at least one middle wheel.

The middle and back wheels can also have a maximum distance d between the at least one middle wheel and the at least one back wheel measured from the rear-most facing point of the at least one middle wheel to the front-most facing point of the at least one back wheel defined by:

$$d = \frac{6r^2 - 3h \cdot r}{2(h-r)},$$

where d is the said maximum distance, r is the radius of the wheel and h is the height of the vertical obstacle to be traversed.

The frame structure can also comprise an undercarriage that is structured so as to be in vertical proximity of the line connecting the rear-most facing point of the at least one middle wheel to the front-most facing point of the at least one back wheel.

The robot can be adapted to traverse vertical obstacles of at least 18 cm height with wheel radius of at least 10 cm and the maximum distance between the front and middle wheels and/or the middle and back wheels measured from the rear-most facing point of the front wheel and/or middle wheel respectively to the front-most facing point of the middle and/or back wheel of 4 cm.

The robot can further comprise a sensing device for sensing obstacles along its forward direction of motion.

The sensing device can be adapted to trigger the pushing device such that a downward force is applied to at least the pair of middle wheels of the robot to facilitate the movement of the front wheels over the obstacles.

The sensing device can comprise means for communicating with a central processing unit, wherein the central processing unit provides instructions to the pushing device based on information received from the sensing device.

The tilting lever can be adapted for at least angular motion in the plane of the robot's wheels in order to apply a downward and/or upward force with respect to the ground.

The pushing device can comprise a motor, and wherein the first and second tilting levers are connected to a rear axle at a first and second pivot point on the first and second axles, respectively.

The pushing device can be adapted for exerting angular force on first and second shafts about the first and second pivot points, so as to alternately generate a downward force on the middle wheels and the back wheels.

The pushing device can be adapted to lift the middle wheels, so that during climbing, their rotational center can transiently extend vertically beyond that of the front wheels', with respect to the vehicle frame.

The invention is also directed to a method comprising the steps of approaching a vertical obstacle with a mobile robot comprising a frame structure having a front end and a back end, the robot comprising at least one front wheel positioned in proximity of the front end of the structure, at least one back wheel positioned in proximity of the back end of the structure, and at least one middle wheel positioned in between the front and back wheels, and at least one further wheel either in a front, middle and/or back position; wherein the at least one front wheel, the at least one back wheel and the at least one middle wheel are arranged on the frame structure such that the robot is supported by said wheels during normal travel along a surface; the robot further comprising at least two motors adapted to drive the wheels, and a motor-driven device for exerting a downward force with respect to the ground, selectively on at least the at least one middle wheel;

sensing the vertical obstacle with one or more sensing devices disposed on the robot;

actuating the one or more front wheels with one or more motors to permit the one or more front wheels to start climbing the vertical obstacle;

actuating the one or more middle and/or back wheels with one or more motors to provide a forward momentum of the robot and thereby increase friction between the one or more front wheels and the vertical obstacle;

exerting a downward force on the one or more middle wheels with the motor-driven device so as to provide a counteracting vertical force on the one or more front wheels and increase traction of the middle wheels, thereby facilitating the climbing of the front wheels;

cease applying the downward force on the one or more middle wheels after the front wheels have reached the top of the obstacle; and complete climbing of the obstacle through the forward momentum of the robot generated by actuating the middle and/or back wheels.

The actuation of front, middle and/or back wheels can be performed simultaneously. The force applied by the wheels leads to increased traction of the front wheels on the curbstone, aiding in the climbing of the front wheels.

The front, middle and back wheels can all be actuated as the robot approaches the vertical obstacle.

The method can further comprise sensing the position of the front wheels on the obstacle by means of the at least one sensing device before ceasing applying the downward force on the one or more middle wheels.

The motor-driven device can comprise a mechanism for providing alternating downward and upward force on the middle wheels and back wheels, and wherein the method further comprises in the previously mentioned step of ceasing applying the downward force exerting an upward force on the back wheels simultaneously to the exerting a downward force on the middle wheels, by means of the motor-driven device, and wherein the method further comprises reversing the application of force on the middle and back wheels, so that a downward force is applied to the back wheels and an upward force on the middle wheels, to facilitate the climbing of the middle wheels of the obstacle, and completing climbing of the obstacle through the forward momentum of the robot generated by actuating the middle and/or back wheels.

The method can further comprise ceasing applying downward or upward force on the middle or back wheels after the sensing device determines that the back wheels have reached the top of the obstacle.

A skilled reader will understand, that any method described above or below and/or claimed and described as a sequence of steps is not restrictive in the sense of the order of steps.

Below, further numbered embodiments of the invention will be discussed.

1. A mobile robot adapted to traverse at least vertical obstacles, the robot comprising a frame structure having a front end and a back end, and further having a front section, a middle section and a back section, the robot comprising
   (a) at least one front wheel positioned in the front section of the robot and extending beyond it in the front, at least one back wheel positioned in the back section of the robot, and at least one middle wheel positioned in the middle section of the robot;
   (b) at least one further wheel positioned either in the front section, middle section and/or back section of the structure;
   and wherein the robot further comprises
   (c) a motor-driven device for exerting a downward and/or upward force with respect to the ground, selectively on the at least one middle wheel; and
   (d) at least two motors, each of which being adapted to drive the wheels and/or the motor-driven device.

2. A robot according to the previous embodiment, wherein the motor-driven device is adapted such that when the robot encounters a vertical obstacle along its direction of movement, a downward and/or upward force can be applied by the motor-driven device through the at least one middle wheel, to facilitate the traversal of the vehicle across the vertical obstacle.

3. A robot according to any of the preceding embodiments, wherein the motor-driven device is further adapted to exert a downward and/or upward force through the at least one back wheel.

4. A robot according to any of the preceding embodiments, wherein the robot further comprises a sensing device for sensing obstacles along its forward direction of motion.

5. A robot according to the previous embodiment, wherein the sensing device comprises at least one of: ultrasonic sensor, Lidar sensor, optical flow sensor, stereo vision sensor, map-based localization device, bumping sensor, odometry-based sensor and wheel slippage sensor.

6. A robot according to the previous two embodiments, wherein the sensing device is adapted to trigger the motor-driven device such that a downward force is applied to at least the middle wheels of the robot to facilitate the movement of the front wheels across the obstacles.
7. A robot according to any one of the previous three embodiments, wherein the motor-driven device is further adapted to communicate with the sensing device and apply a downward and/or upward force on at least the middle wheels based on information from the sensing device.
8. The robot according to the previous embodiment, wherein the motor driven device is adapted to alternately apply downward force to the middle wheels and the back wheels based on information from the sensing device.
9. A robot according to the previous embodiment, wherein the sensing device comprises means for communicating with a central processing unit, and wherein the central processing unit provides instructions to the motor-driven device based on information received from the sensing device.
10. A robot according to any one of the preceding embodiments further comprising at least one tilting lever connecting at least one middle and one back wheel, preferably two shafts connecting middle and back wheels on each of the left and the right sides of the robot.
11. A robot according to the preceding embodiment wherein the tilting lever is adapted for at least angular motion in the plane of the robot's wheels in order to apply a downward and/or upward force with respect to the ground.
12. A robot according to any of the preceding embodiments, wherein the robot comprises at least two middle wheels and two back wheels, wherein the motor-driven device comprises a motor and two tilting levers and wherein one set of wheels comprising at least one middle wheel and a back wheel is connected to a first tilting lever, and a second set of at least one middle wheel and a back wheel is connected to a second tilting lever, and wherein the first and second tilting levers are connected to a rear axle at a first and second pivot point on the first and second tilting levers, respectively.
13. A robot according to the preceding embodiment, wherein the motor-driven device is adapted for exerting angular force on the first and second tilting lever about the first and second pivot points, so as to alternately generate a downward force on the middle wheels and the back wheels.
14. A robot according to any of the preceding embodiments wherein the motor-driven device is further adapted to lift the middle wheels, so that during climbing, their rotational center transiently extends vertically beyond that of the front wheels', with respect to the vehicle frame.
15. A robot according to any of the preceding embodiments wherein the motor-driven device is further adapted to lift and/or push down the back wheels, so that when a downward force is applied to the middle wheels, a counteracting upward force is simultaneously applied to the back wheels, and when an upward force is applied to the middle wheels, a counteracting downward force is simultaneously applied to the back wheels.
16. A robot according to any of the preceding embodiments wherein the motors driving the wheels are electrical motors.
17. A robot according to any of the preceding embodiments wherein the front wheels are driven.
18. A robot according to any of the preceding embodiments wherein all of the wheels are driven.
19. A robot according to any of the preceding embodiments wherein the motor-driven device comprises at least one piston-driven device adapted to drive at least one wheel in a vertical direction with respect to the ground.
20. The robot according to the previous embodiment, wherein the motor-driven device comprises two piston-driven devices for driving the middle wheels in a vertical direction with respect to ground.
21. A robot according to any of the preceding embodiments comprising at least 4 (four) electric motors adapted to drive the wheels.
22. The robot according to the previous embodiment, comprising two motors for driving each of two front wheels and two motors for driving two sets of middle and back wheels, each of said motors driving at least one middle wheel and a back wheel that is disposed along one side of the robot.
23. A robot according to any of the preceding embodiments wherein the robot's center of mass is located between the middle and the front end of the robot.
24. A robot according to any of the preceding embodiments wherein the robot's center of mass is located between the middle of the robot and half of the distance from the middle to the front end of the robot.
25. A robot according to any of the preceding embodiments adapted for motion in an unstructured outdoor environment.
26. A robot according to any of the preceding embodiments adapted to traverse vertical obstacles of a height of about 10 to about 25 cm, such as about 15 to about 20 cm, such as curbstones.
27. A robot according to any of the preceding embodiments wherein the wheel diameter is 10-30 cm, preferably 15-25 cm, more preferably about 20 cm.
28. A robot according to any of the preceding embodiments, wherein the front wheels protrude in front of the frame structure by 1 to 8 cm, preferably by 1 to 6 cm, more preferably by 2 to 5 cm.
29. A robot according to any of the preceding embodiments wherein the wheels protrude beneath the frame by at least 5 cm, preferably at least 6 cm, more preferably by at least 7 cm.
30. A robot according to any of the preceding embodiments wherein the wheels comprise pneumatic tires made of a caoutchouc compound and/or synthetic rubber.
31. A robot according to any of the preceding embodiments wherein the static friction coefficient $\mu_s$ between the wheels and the obstacle is 0.9-1.1 for dry surface and 0.2-0.4 for wet surface.
32. A robot according to any of the preceding embodiments wherein the front wheel(s), the back wheel(s) and the center wheel(s) are arranged on the frame structure such that the robot is supported by at least two wheels during normal travel along a surface.
33. The robot according to any one of the preceding embodiments, further comprising an enclosed space for holding at least one delivery.
34. The robot according to the preceding embodiment, further comprising a secure access device for providing access to the space.
35. The robot according to the preceding embodiment, wherein the secure access device comprises a closure mechanism that is controlled by a secure interface.
36. A combination of a robot according to any of the preceding embodiments and a delivery comprised within the robot, wherein the center of mass of the combination is located between the middle and the front end of the robot.

37. A mobile robot adapted to traverse at least vertical obstacles, the robot comprising a frame structure having a front end and a back end, the robot comprising
    (a) at least one pair of front wheels positioned in proximity of the front end of the structure, at least one pair of back wheels positioned towards the back end of the structure and at least one pair of middle wheels positioned in between the front and back wheels;
    (b) at least two motors adapted to drive the wheels; and
    (c) at least one pushing device for exerting a downward force with respect to the ground, selectively on the at least one middle wheel.

38. A robot according to embodiment 37 wherein the pushing device is driven by a motor, preferably an electrical motor.

39. A robot according to any of the preceding two embodiments, wherein the pushing device is adapted such that when the robot encounters a vertical obstacle along its direction of movement, a downward and/or upward force can be applied by the device through at least one pair of middle wheels, to facilitate the traversal of the vehicle across the vertical obstacle.

40. A robot according to any of the preceding three embodiments, wherein the pushing device is further adapted to exert a downward and/or upward force through at least one pair of back wheels.

41. A robot according to any of the embodiments 37 to 40, wherein the robot further comprises a sensing device for sensing obstacles along its forward direction of motion.

42. A robot according to the previous embodiment, wherein the sensing device is adapted to trigger the pushing device such that a downward force is applied to at least the pair of middle wheels of the robot to facilitate the movement of the front wheels over the obstacles.

43. A robot according to any one of the previous two embodiments, wherein the sensing device comprises at least one of: ultrasonic sensor, Lidar sensor, optical flow sensor, stereo vision sensor, map-based localization device, bumping sensor, odometry-based sensor and wheel slippage sensor.

44. A robot according to any one of the previous three embodiments, wherein the pushing device is further adapted to communicate with the sensing device and apply a downward and/or upward force on the middle wheels based on information from the sensing device.

45. A robot according to any one of the embodiments 37 to 44, wherein the pushing device comprises at least one tilting lever connecting at least one middle and one back wheel, preferably two shafts connecting middle and back wheels on each of the left and the right sides of the robot.

46. The robot according to the previous embodiment, wherein the pushing device is adapted to alternately apply force to the middle wheels and the back wheels based on information from the sensing device.

47. A robot according to the previous embodiment, wherein the sensing device comprises means for communicating with a central processing unit, and wherein the central processing unit provides instructions to the pushing device based on information received from the sensing device.

48. A robot according to any of the preceding three embodiments wherein the tilting lever is adapted for at least angular motion in the plane of the robot's wheels in order to apply a downward and/or upward force with respect to the ground.

49. A robot according to any of the preceding embodiments 46 to 48, wherein the pushing device comprises a motor, and wherein the first and second tilting levers are connected to a rear axle at a first and second pivot point on the first and second axles, respectively.

50. A robot according to the preceding embodiment, wherein the pushing device is adapted for exerting angular force on first and second shafts about the first and second pivot points, so as to alternately generate a downward force on the middle wheels and the back wheels.

51. A robot according to any of the preceding embodiments 37 to 50, wherein the pushing device is adapted to lift the middle wheels, so that during climbing, their rotational center can transiently extend vertically beyond that of the front wheels', with respect to the vehicle frame.

52. A robot according to any of the preceding embodiments 37 to 51, wherein the pushing device is further adapted to lift and/or push down the back wheels, so that when a downward force is applied to the middle wheels, a counteracting upward force is simultaneously applied to the back wheels, and when an upward force is applied to the middle wheels, a counteracting downward force is simultaneously applied to the back wheels.

53. A robot according to any of the preceding embodiments 37 to 52 wherein the motors driving the wheels and/or the pushing device are electrical.

54. A robot according to any of the preceding embodiments 37 to 53, wherein the front wheels are driven.

55. A robot according to any of the preceding embodiments 37 to 54 comprising at least 4 (four) electric motors adapted to drive the wheels.

56. A robot according to any of the preceding embodiments 37 to 55, wherein the robot's center of mass is located between the middle and the front end of the robot.

57. A robot according to any of the preceding embodiments 37 to 56, wherein the robot's center of mass is located between the middle of the robot and half of the distance from the middle to the front end of the robot.

58. A robot according to any of the preceding embodiments 37 to 57, adapted for motion in an unstructured outdoor environment.

59. A robot according to any of the preceding embodiments 37 to 58, adapted to traverse vertical obstacles of a height of 10-30 cm, preferably 15-25 cm, more preferably about 20 cm.

60. A robot according to any one of the preceding embodiments 37 to 59, wherein the pairs of front, middle and back wheels are connected on respective axles.

61. The robot according to the previous embodiment, wherein the distance between wheels on each of the axles is approximately equal.

62. A robot according to any of the preceding embodiments 37 to 61, wherein the wheel diameter is 10-30 cm, preferably 15-25 cm, more preferably about 20 cm.

63. A robot according to any of the preceding embodiments 37 to 62, wherein the wheels protrude beneath the frame by at least 5 cm, preferably at least 6 cm, more preferably by at least 7 cm.

64. A robot according to any of the preceding embodiments 37 to 63, wherein the front wheels protrude in front of the frame structure by 1 to 8 cm, preferably by 1 to 6 cm, more preferably by 2 to 5 cm.

65. A robot according to any of the preceding embodiments 37 to 64, wherein the wheels comprise pneumatic tires made of a caoutchouc compound and/or synthetic rubber.
66. A robot according to any of the preceding embodiments 37 to 65, wherein the static friction coefficient $\mu_s$ between the wheels and the obstacle is 0.9-1.1 for dry surface and 0.2-0.4 for wet surface.
67. The robot according to any one of the preceding embodiments 37 to 66, further comprising a space for holding at least one delivery.
68. The robot according to any one of the preceding embodiments 37 to 67, further comprising an enclosed space for holding at least one delivery.
69. The robot according to the preceding embodiment, further comprising a secure access device for providing access to the space.
70. The robot according to the preceding embodiment, wherein the secure access device comprises a closure mechanism that is controlled by a secure interface.
71. A combination of a robot according to any of the preceding embodiments 37 to 70 and a delivery comprised within the robot, wherein the center of mass of the combination is located between the middle and the front end of the robot.
72. A mobile robot adapted to traverse vertical obstacles with a predefined height, the robot comprising a frame structure having a front end and a back end, the robot comprising
    (a) at least one pair of front wheels positioned in proximity of the front end of the structure, at least one pair of back wheels positioned towards the back end of the structure and at least one pair of middle wheels positioned in between the front and back wheels;
    and wherein the said wheels have radius r and are further characterized by
    (b) a maximum distance d between the at least one front wheel and the at least one middle wheel measured from the rear-most facing point of the at least one front wheel to the front-most facing point of the at least one middle wheel is defined by $$d = \frac{6r^2 - 3h \cdot r}{2(h - r)},$$

where d is the said maximum distance, r is the radius of the wheel and h is the predefined height of the vertical obstacle.
73. A robot according to embodiment 72 wherein the frame structure comprises an undercarriage that is structured so as to be in vertical proximity of a line connecting the rear-most facing point of the at least one front wheel to the front-most facing point of the at least one middle wheel.
74. A robot according to any one of the embodiments 72 to 73 wherein the middle and back wheels are further characterized by a maximum distance d' between the at least one middle wheel and the at least one back wheel measured from the rear-most facing point of the at least one middle wheel to the front-most facing point of the at least one back wheel defined by $$d' = \frac{6r^2 - 3h' \cdot r}{2(h' - r)},$$

where d' is the said maximum distance, r is the radius of the wheel and h' is the height of the vertical obstacle to be traversed.
75. A robot according to any one of the embodiments 72 to 74 wherein the frame structure comprises an undercarriage that is structured so as to be in vertical proximity of the line connecting the rear-most facing point of the at least one middle wheel to the front-most facing point of the at least one back wheel.
76. The robot according to any one of the embodiments 72 to 75, adapted to traverse vertical obstacles of at least 18 cm height with wheel radius of at least 10 cm and the maximum distance between the front and middle wheels and/or the middle and back wheels measured from the rear-most facing point of the front wheel and/or middle wheel respectively to the front-most facing point of the middle and/or back wheel of 4 cm.
77. A robot according to any one of the embodiments 72 to 76 further comprising at least two motors adapted to drive the wheels.
78. A robot according to any one of the embodiments 72 to 77 further comprising at least one pushing device for exerting a downward force with respect to the ground, selectively on the at least one middle wheel.
79. A robot according to the preceding embodiment wherein the pushing device is driven by a motor, preferably an electrical motor.
80. A robot according to any of the preceding two embodiments, wherein the pushing device is adapted such that when the robot encounters a vertical obstacle along its direction of movement, a downward and/or upward force can be applied by the device through at least one pair of middle wheels, to facilitate the traversal of the vehicle across the vertical obstacle.
81. A robot according to any of the preceding three embodiments, wherein the pushing device is further adapted to exert a downward and/or upward force through at least one pair of back wheels.
82. A robot according to any of the preceding embodiments 78 to 81, wherein the robot further comprises a sensing device for sensing obstacles along its forward direction of motion.
83. A robot according to the preceding embodiment, wherein the sensing device is adapted to trigger the pushing device such that a downward force is applied to at least the pair of middle wheels of the robot to facilitate the movement of the front wheels over the obstacles.
84. A robot according to any one of the preceding two embodiments, wherein the sensing device comprises at least one of: ultrasonic sensor, Lidar sensor, optical flow sensor, stereo vision sensor, map-based localization device, bumping sensor, odometry-based sensor and wheel slippage sensor.
85. A robot according to any one of the preceding three embodiments, wherein the pushing device is further adapted to communicate with the sensing device and apply a downward and/or upward force on the middle wheels based on information from the sensing device.
86. A robot according to any one of the embodiments 78 to 85, wherein the pushing device comprises at least one tilting lever connecting at least one middle and one back wheel, preferably two shafts connecting middle and back wheels on each of the left and the right sides of the robot.
87. The robot according to the previous embodiment, wherein the pushing device is adapted to alternately apply force to the middle wheels and the back wheels based on information from the sensing device.

88. A robot according to the previous embodiment, wherein the sensing device comprises means for communicating with a central processing unit, and wherein the central processing unit provides instructions to the pushing device based on information received from the sensing device.

89. A robot according to any of the preceding three embodiments wherein the tilting lever is adapted for at least angular motion in the plane of the robot's wheels in order to apply a downward and/or upward force with respect to the ground.

90. A robot according to any of the preceding embodiments 87 to 89, wherein the pushing device comprises a motor, and wherein the first and second tilting levers are connected to a rear axle at a first and second pivot point on the first and second axles, respectively.

91. A robot according to the preceding embodiment, wherein the pushing device is adapted for exerting angular force on first and second shafts about the first and second pivot points, so as to alternately generate a downward force on the middle wheels and the back wheels.

92. A robot according to any of the preceding embodiments 78 to 91, wherein the pushing device is adapted to lift the middle wheels, so that during climbing, their rotational center can transiently extend vertically beyond that of the front wheels', with respect to the vehicle frame.

93. A robot according to any of the preceding embodiments 78 to 92, wherein the pushing device is further adapted to lift and/or push down the back wheels, so that when a downward force is applied to the middle wheels, a counteracting upward force is simultaneously applied to the back wheels, and when an upward force is applied to the middle wheels, a counteracting downward force is simultaneously applied to the back wheels.

94. A robot according to any of the preceding embodiments 77 to 93 wherein the motors driving the wheels and/or the pushing device are electrical.

95. A robot according to any of the preceding embodiments 77 to 94, wherein the front wheels are driven.

96. A robot according to any of the preceding embodiments 77 to 95 comprising at least 4 (four) electric motors adapted to drive the wheels.

97. A robot according to any of the preceding embodiments 72 to 96, wherein the robot's center of mass is located between the middle and the front end of the robot.

98. A robot according to any of the preceding embodiments 72 to 97, wherein the robot's center of mass is located between the middle of the robot and half of the distance from the middle to the front end of the robot.

99. A robot according to any of the preceding embodiments 72 to 98, adapted for motion in an unstructured outdoor environment.

100. A robot according to any of the preceding embodiments 72 to 99, adapted to traverse vertical obstacles of a height of 10-30 cm, preferably 15-25 cm, more preferably about 20 cm.

101. A robot according to any one of the preceding embodiments 72 to 100, wherein the pairs of front, middle and back wheels are connected on respective axles.

102. The robot according to the previous embodiment, wherein the distance between wheels on each of the axles is approximately equal.

103. A robot according to any of the preceding embodiments 72 to 102, wherein the wheel diameter is 10-30 cm, preferably 15-25 cm, more preferably about 20 cm.

104. A robot according to any of the preceding embodiments 72 to 103, wherein the wheels protrude beneath the frame by at least 5 cm, preferably at least 6 cm, more preferably by at least 7 cm.

105. A robot according to any of the preceding embodiments 72 to 104, wherein the front wheels protrude in front of the frame structure by 1 to 8 cm, preferably by 1 to 6 cm, more preferably by 2 to 5 cm.

106. A robot according to any of the preceding embodiments 72 to 105, wherein the wheels comprise pneumatic tires made of a caoutchouc compound.

107. A robot according to any of the preceding embodiments 72 to 106, wherein the static friction coefficient $\mu_s$ between the wheels and the obstacle is 0.9-1.1 for dry surface and 0.2-0.4 for wet surface.

108. The robot according to any one of the preceding embodiments 72 to 107, further comprising a space for holding at least one delivery.

109. The robot according to any one of the preceding embodiments 72 to 108, further comprising an enclosed space for holding at least one delivery.

110. The robot according to the preceding embodiment, further comprising a secure access device for providing access to the space.

111. The robot according to the preceding embodiment, wherein the secure access device comprises a closure mechanism that is controlled by a secure interface.

112. A combination of a robot according to any of the preceding embodiments 72 to 111 and a delivery comprised within the robot, wherein the center of mass of the combination is located between the middle and the front end of the robot.

113. A climbing method comprising
    (a) approaching a vertical obstacle with a mobile robot comprising a frame structure having a front end and a back end, the robot comprising at least one front wheel positioned in proximity of the front end of the structure, at least one back wheel positioned in proximity of the back end of the structure, and at least one middle wheel positioned in between the front and back wheels, and at least one further wheel either in a front, middle and/or back position; wherein the at least one front wheel, the at least one back wheel and the at least one middle wheel are arranged on the frame structure such that the robot is supported by said wheels during normal travel along a surface; the robot further comprising at least two motors adapted to drive the wheels, and a motor-driven device for exerting a downward force with respect to the ground, selectively on at least the at least one middle wheel;
    (b) sensing the vertical obstacle with one or more sensing devices disposed on the robot;
    (c) actuating the one or more front wheels with one or more motors to permit the one or more front wheels to start climbing the vertical obstacle;
    (d) actuating the one or more middle and/or back wheels with one or more motors to provide a forward momentum of the robot and thereby increase friction between the one or more front wheels and the vertical obstacle;
    (e) exerting a downward force on the one or more middle wheels with the motor-driven device so as to provide a counteracting vertical force on the one or more front wheels and increase traction of the middle wheels, thereby facilitating the climbing of the front wheels;
    (f) ceasing applying the downward force on the one or more middle wheels after the front wheels have reached the top of the obstacle; and (g) completing climbing of the obstacle through the forward momentum of the robot generated by actuating the middle and/or back wheels.
114. The method of embodiment 113, wherein the actuation of front, middle and/or back wheels is performed simultaneously.
115. The method of embodiment 113, wherein the front, middle and back wheels are all actuated as the robot approaches the vertical obstacle.
116. The method of any one of the embodiments 113 to 115 wherein the method further includes sensing the position of the front wheels on the obstacle by means of the at least one sensing device before ceasing applying the downward force on the one or more middle wheels.
117. The method of any one of the embodiments 113 to 116, wherein the motor-driven device comprises a mechanism for providing alternating downward and upward force on the middle wheels and back wheels, and wherein the method further comprises in step (e) exerting an upward force on the back wheels simultaneously to the exerting a downward force on the middle wheels, by means of the motor-driven device, and wherein the method further comprises, following step (f):
   (g) reversing the application of force on the middle and back wheels, so that a downward force is applied to the back wheels and an upward force on the middle wheels, to facilitate the climbing of the middle wheels of the obstacle, and
   (h) completing climbing of the obstacle through the forward momentum of the robot generated by actuating the middle and/or back wheels.
118. The method of embodiment 117, further comprising ceasing applying downward or upward force on the middle or back wheels after the sensing device determines that the back wheels have reached the top of the obstacle.
119. The method of any one of the embodiments 113 to 118, wherein the mobile robot is a robot or combination as described in any one of the embodiments 1 to 112.
120. A mobile robot, particularly according to any one of the preceding embodiments 1 to 112, comprising
   (a) a frame with at least one front wheel, at least two middle wheels and at least two rear wheels;
   (b) wherein at least one middle wheel and at least one rear wheel are connected by a tilting lever that is arranged on each of opposing sides of or to the frame; and
   (c) wherein each tilting lever can be turned around a lever bearing located between the respective axial centers of rotation of each pair of wheels.
121. A robot according to embodiment 120 wherein the tilting lever is adapted to rotate freely until a certain angle is reached, particularly when the robot encounters uneven ground along its direction of movement, allowing the robot to traverse such uneven ground smoothly.
122. A robot according to any of the preceding embodiments 120 or 121 wherein the tilting lever can be turned around the lever bearing by at most 60°, preferably on either side.
123. A robot according to any of the preceding embodiments 120 to 122 wherein the tilting lever can be turned around the lever bearing by at most 55°, preferably on either side.
124. A robot according to any one of embodiments 120 to 123 wherein the tilting lever can be turned around the lever bearing by at most 50°, preferably on either side.
125. A robot according to any one of embodiments 120 to 124 wherein the tilting lever can be turned around the lever bearing by at most 45°, preferably on either side.
126. A robot according to any one of embodiments 120 to 125 wherein the tilting lever can be turned around the lever bearing by at most 40°, preferably on either side.
127. A robot according any one of embodiments 120 to 126 wherein the tilting lever can be turned around the lever bearing by at most 35°, preferably on either side.
128. A robot according to any one of embodiments 120 to 127 wherein the tilting lever can be turned around the lever bearing by at most 30°, preferably on either side.
129. A robot according to any one of embodiments 120 to 128 wherein the tilting lever can be turned around the lever bearing by at most 25°, preferably on either side.
130. A robot according to any one of embodiments 120 to 129 wherein the tilting lever can be turned around the lever bearing by at most 20°, preferably on either side.
131. A robot according to any one of embodiments 120 to 130 further comprising a sensor adapted to sense the absolute and/or relative angular position of the tilting lever.
132. A robot according to embodiment 131 wherein the sensor is adapted to sense the absolute and/or relative angular position of the tilting lever is at least one Hall effect non-contact rotary position sensor.
133. A robot according to embodiment 133 wherein the sensor adapted to sense the absolute and/or relative angular position of the tilting lever is any one or a combination of at least one potentiometer, at least one optical encoder, at least one magnetic encoder and/or at least one visual camera-like system.
134. A robot according to any one of embodiments 131, 132 or 133 wherein the sensor is adapted to sense the relative angular position of the tilting lever is calibrated at the beginning of operation, preferably by moving the lever to an extreme position and by calibrating it there.
135. A robot according to any one of embodiments 131 to 134, further comprising a lever turn motor and wherein the lever turn motor is adapted to start actuating the tilting lever upon receiving sensor data.
136. A robot according the preceding embodiment wherein the sensor data can comprise tilting angle, force applied to any of the wheels, visual data, Lidar data and or Hall effect non-contact rotation sensor data.
137. A robot according to any of the embodiments 120 to 136 wherein the tilting lever can rotate freely and/or be actuated by a lever turn motor.
138. A robot according to any one of the embodiments 120 to 137 wherein the tilting levers on each side can be rotate freely and/or actuated by a lever turn motor independent from each other.
139. A robot according to any one of the embodiments 120 to 138 wherein the tilting levers on each side can rotate freely with the lever turn motor connected to the tilting levers slightly resisting the rotation.
140. A robot according to any one of the embodiments 120 to 139 wherein the tilting levers on each side can be rotated freely, the robot further comprising a clutch that can disconnect the lever turn motor driving the tilting levers.
141. A robot according to any of the embodiments 120 to 140 wherein the robot is adapted to climb obstacles of up to 18 cm by rotating the tilting lever.
142. A robot according to any one of the embodiments 120 to 141 wherein the tilting lever is adapted to rotate freely until a particular inclination angle is reached, at which point the tilting turn motor is adapted to engage, such point being the engagement point.

143. A robot according to the preceding embodiment wherein the tilting turn motor is adapted to engage after the tilting lever has rotated freely for at least 10°, more preferably such as at least 15°, more preferably such as at least 20° and even more preferably such as at least 25°.
144. A robot according to any of the preceding two embodiments wherein the tilting lever is adapted to rotate freely over a range of 25°-45° from one engagement point to the next.
145. A climbing method of a mobile robot comprising one front wheel, at least two middle wheels and at least two rear wheels, wherein the robot can be as described in claims 1-16, said method consisting of
    (a) providing a mobile robot comprising a frame with at least one front wheel, at least two middle wheels and at least two rear wheels; and
    (b) connecting the at least one middle wheel and the at least one rear wheel by a tilting lever that is arranged on each of the opposing sides of or to the frame, forming a pair of wheels; and
    (c) turning the tilting lever around a lever bearing located between the respective axial centers of rotation of each pair of wheels when traversing an obstacle.
146. A climbing method according to the embodiment 145 further comprising the steps of
    (d) engaging at least one lever turn motor once the tilting lever reaches a certain tilting angle; and
    (e) exerting a downward force on the middle wheels with a mechanism driven by the at least one lever turn motor so as to provide a counteracting vertical force on the one or more front wheels and increase traction of the middle wheels, thereby facilitating the climbing of the front wheels; and
    (f) ceasing exerting the downward force on the one or more middle wheels after the front wheels have reached the top of the obstacle; and
    (g) completing climbing of the obstacle through the forward momentum of the robot generated by actuating the middle and/or back wheels.
147. The method according to any of the preceding two embodiments, wherein the front, middle and back wheels are all actuated as the robot approaches the vertical obstacle.
148. The method according to any of the preceding three embodiments, wherein the method further includes sensing the position of the front wheels on the obstacle by means of the at least one sensing device before ceasing applying the downward force on the one or more middle wheels.

As will be apparent to the skilled person, the method can be realized using any robot as described in the foregoing description and the following description of embodiments. In particular, the method can be realized with various configurations of wheel configuration, and mechanisms for actively applying force to the middle and/or back wheels, as described herein.

The above features along with additional details of the invention, are described further in the examples below, which are intended to further illustrate the invention but are not intended to limit its scope in any way.

BRIEF DESCRIPTION OF THE DRAWINGS

FIG. 2 shows a schematic and exemplifying arrangement of elements in accordance with the present invention.

FIG. 3 shows an embodiment in accordance with the present invention before, during and after the traversal of a curbstone.

FIG. 5b shows an inclined embodiment according to FIG. 5a.

DESCRIPTION OF VARIOUS EMBODIMENTS

Figure 1:
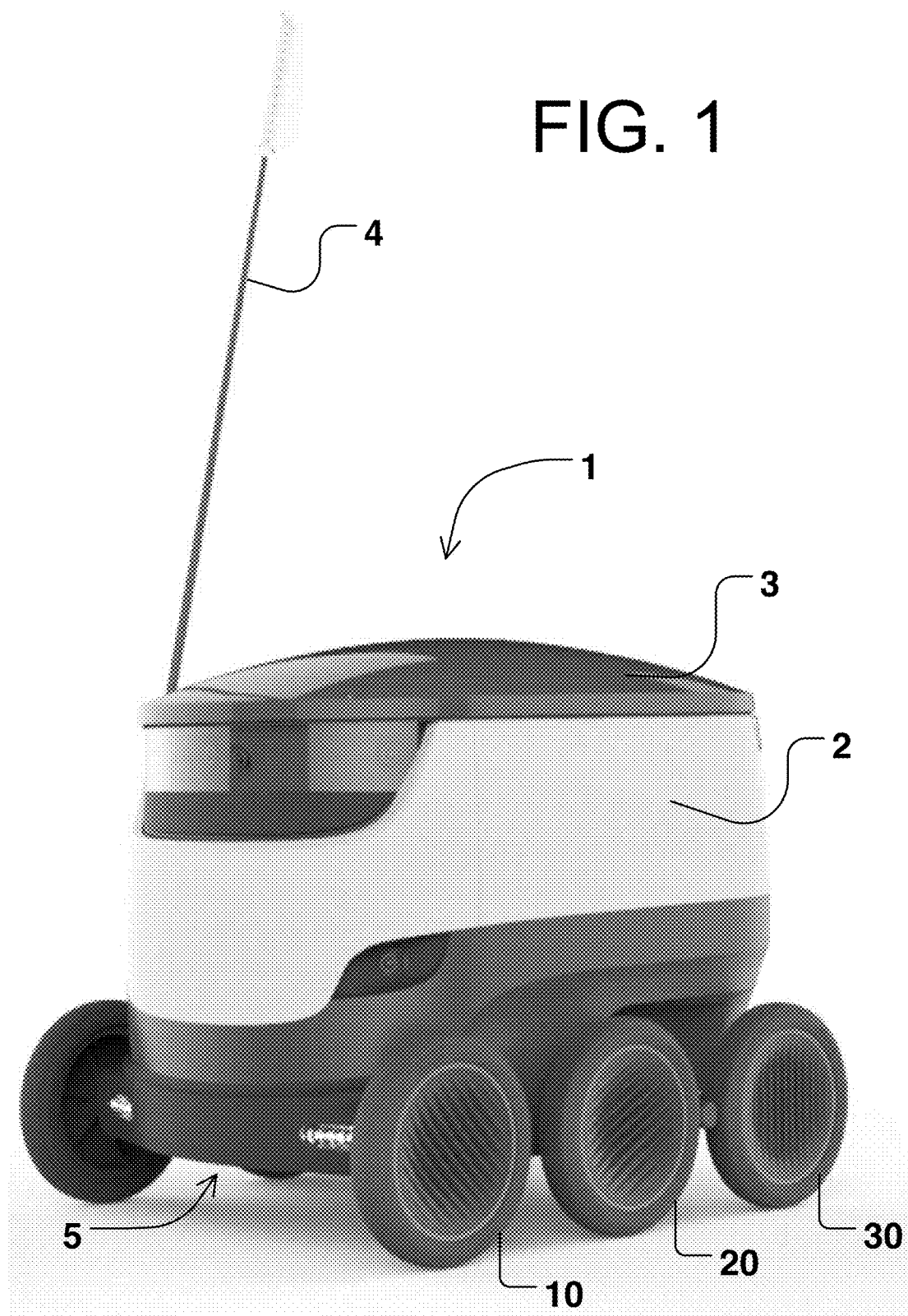
FIG. 1 shows a perspective view onto a robot embodiment in accordance with the present invention.

In the following, exemplary embodiments of the invention will be described, referring to the figures. These examples are provided to provide further understanding of the invention, without limiting its scope.

In the following description, a series of features and/or steps are described. The skilled person will appreciate that unless required by the context, the order of features and steps is not critical for the resulting configuration and its effect. Further, it will be apparent to the skilled person that irrespective of the order of features and steps, the presence or absence of time delay between steps, can be present between some or all of the described steps.

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components.

The present invention also covers the exact terms, features, values and ranges etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

The term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

It will be appreciated that variations to the foregoing embodiments of the invention can be made while still falling within the scope of the invention. Alternative features serving the same, equivalent or similar purpose can replace features disclosed in the specification, unless stated otherwise. Thus, unless stated otherwise, each feature disclosed represents one example of a generic series of equivalent or similar features.

Use of exemplary language, such as "for instance", "such as", "for example" and the like, is merely intended to better illustrate the invention and does not indicate a limitation on the scope of the invention unless so claimed. Any steps described in the specification may be performed in any order or simultaneously, unless the context clearly indicates otherwise.

All of the features and/or steps disclosed in the specification can be combined in any combination, except for combinations where at least some of the features and/or steps are mutually exclusive. In particular, preferred features of the invention are applicable to all aspects of the invention and may be used in any combination.

Reference numerals have just been referred to for reasons of quicker understanding and are not intended to limit the scope of the present invention in any manner.

FIG. 1 shows one example of a robot 1 in accordance with the invention. As can be seen the robot can comprise a body 2 and a lid 3. Other configurations for different applications are also possible. The robot embodiment shown can be particularly used for the transfer of deliveries (such as mail, groceries, parcels, packages, flowers and/or purchases). For communication reasons further electronics, telecommunication devices, computers, sensors etc. or parts thereof can be used. In the embodiment shown an antenna 4 is also shown.

A undercarriage or frame 5 is particularly arranged at the bottom of the robot 1. As can be seen in the embodiment shown 3 sets or pairs of wheels are provided, one or more front wheels 10, one or more middle wheels 20 and one or more rear wheels 30. The front wheels 10 can be steered and can slightly protrude in front of the body 2. Also other wheels may be steered. The wheels 10, 20, 30 could also be covered by any kind of shields and/or can be integrated into the body 2.

FIG. 2 shows a schematic sketch only. Reference numerals are provided for elements on one side only, in case further corresponding elements are provided on the other side. The front wheels 10 can be driven and can extend over the front part of the body 2 and/or frame 5 for the reasons described before. A front motor 12 can drive a front axle 11 and the front wheel 10 being attached. As mentioned before, the front wheels 10 can be steered which is not shown. A front control 14 can control the front motor 12 and can also be connected to a central or intermediate robot control (not shown). The front wiring 13 can connect the front control 14 and the front motor 12. The same applies to the other side, i.e. to the other front wheel, front motor and front control (not numbered). A central motor driving both front wheels 10 can also be provided, but requires more elements. The arrangement shown can thus be an easier, more reliable and less expensive design.

The middle wheels 20 can be connected by a common middle axle 21 but could also be driven by individual axles (not shown).

The rear wheels 30 can be connected by a common rear axle 31 but could also be driven by individual axles (not shown).

Besides the options mentioned already, an embodiment particularly for moving the middle wheels 20 away from the body and/or frame 5 is shown for tilting the arrangement of middle wheels 20 and rear wheels 30. A tilting assembly 40 can do this. In the embodiment shown, the middle wheels 20 and the rear wheels 30 are driven together by rear motors 44. Alternatively, a common motor (not shown) could be arranged for driving all wheels in the middle and in the rear. The motors 44 are driving a lever shaft 43 and the rotational movement and/or force will be further delivered to the middle wheels 20 and rear wheels 30 by a mechanism not shown. This mechanism could be any known means for transferring and/or gearing the rotational movement, such as by gear(s), pulley(s), chain(s) etc. or any combination thereof. Alternatively, the motors could also be located in the wheels or on the axles the wheels are directly connected to. This can apply to all wheels. A respective rear control 46 can control the rear motor 44 either individually on each side or one rear control 46 could also control the rear motors 44 together. The rear control 46 can also communicate with a central control (not shown).

A tilting lever or tilting shaft 41 or a unit working as a connection between the middle wheels 20 and the rear wheels 30 fixes these wheels in relation to each other. The tilting lever 41 can be turned and will allow the wheels 20, 30 to be driven and to tilt.

A tilting axle (lever bearing) 42 allows the arrangement of the middle wheels 20 and rear wheels 30 as well as the tilting lever 41 to turn. The tilting axle (lever bearing) 42 can be turned itself by a turning mechanism 47 for transferring and/or gearing a rotational movement, such as by gear(s), pulley(s), chain(s) etc. or any combination thereof. The rotational movement is provided, when needed, by a turning motor 49 driving a turning shaft 48 which will then make the tilting axle (lever bearing) 42 turn over the turning mechanism 47. A turning control 51 is connected with the turning motor 49 by a turning wiring 50. Again, the turning control 51 and turning wiring 50 may also communicate with a more central control (not shown).

The tilting assembly 40 can just be arranged on one side but also on both sides. In case it is arranged on one side, the middle wheels 20 and the rear wheels 30 can be connected by the axes 21 and 31, respectively.

FIG. 3 shall exemplify different situations of climbing an obstacle, such as a curbstone, by the robot 1. For reasons of clarity, reference numbers are just shown in sketch no. 1. Middle wheels 20 and rear wheels 30 are both connected to a tilting lever 41. A curbstone 60 is shown being approached by the robot 1. In case of no other sensors, the front wheels 10 may touch the curbstone. This can initiate the climbing of the robot 1 onto the curbstone, as shown in sketch no. 2. The traction of the front wheel onto the curbstone's vertical surface, the movement of the middle wheels away from the robot generated by rotational movement of the tilting lever 41, the movement of the rear wheels towards the body of the robot and/or the forward momentum of the robot, aided by the force applied by the driven middle and/or rear wheels to keep the front wheels in contact with the curbstone vertical surface initiate the climbing of the robot as shown. A motor for driving the tilting lever (not shown) will be turned on at this stage, so as to apply rotational force to the tilting lever 41.

When the front wheels are on top of the curbstone, as shown in sketch no. 3, the middle wheels are further moved towards the curbstone by the moving robot 1 until they touch the curbstone 60 as shown in sketch no. 4. During this phase, the tilting of the robot is at its maximum, at least for the curbstone shown. A further tilting may be possible when climbing a higher curbstone.

In sketch no. 5, the middle wheels are climbing up the curbstone and the tilting action of the tilting mechanism is reversed, such that the middle wheels move towards the frame of the robot, while the back wheels move away from the robot, driven by the tilting lever 41. It will even reverse further as is apparent from sketch no. 6. By this action, maximum traction of all wheels and maximum stability of the robot during climbing can be obtained.

During further progress of the robot, the tilting assembly will return back to a neutral position so that the wheels are in one plane or generally in one plane again. This is demonstrated in sketch no. 8. During such forward motion, the tilting mechanism is in a neutral position, and the motor driving the tilting mechanism is generally switched off.

It is not necessary to keep all wheels on the ground at all times, and this may even not be feasible when the robot reaches an obstacle under another angle than shown in FIG. 3. However, the robot can be designed and programmed to approach obstacles perpendicularly so that a stable and successful climbing of obstacles can be achieved.

Figure 4A:
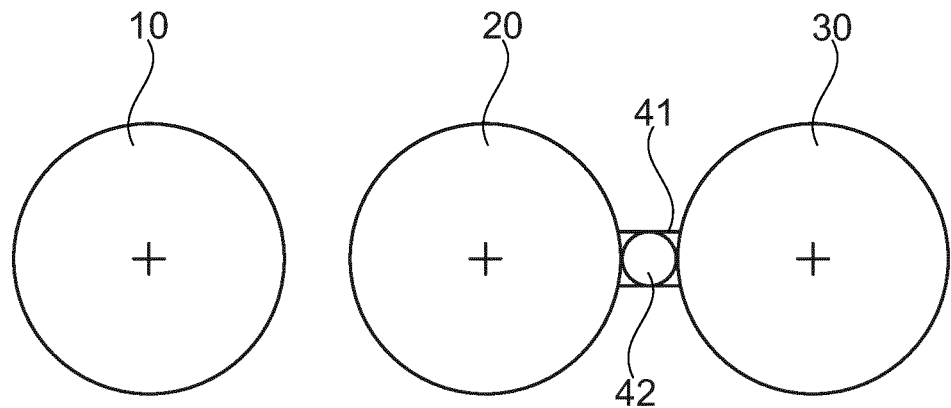
FIG. 4a shows just the wheels of the robot according to one embodiment with wheels aligned.

FIG. 4 shows a side view of one embodiment of the wheels of the robot wherein two back wheels are arranged on a tilting lever 41 that sits on a lever shaft (not shown). In FIG. 4a, the wheels 10, 20, 30 are all horizontally or essentially horizontally aligned (with respect to ground) on a straight line and the tilting lever 41 is aligned to or parallel to the frame of the robot (not shown). The tilting lever 41 is adapted to rotate around the lever bearing 42 so that the middle wheel 20 and the back wheel 30 move ascend or descend, depending on the direction of rotation. Thus, during clockwise rotation the back wheel 30 descends and the center wheel ascends, while the during anticlockwise rotation the movement of the center and back wheels is reversed.

Figure 4B:
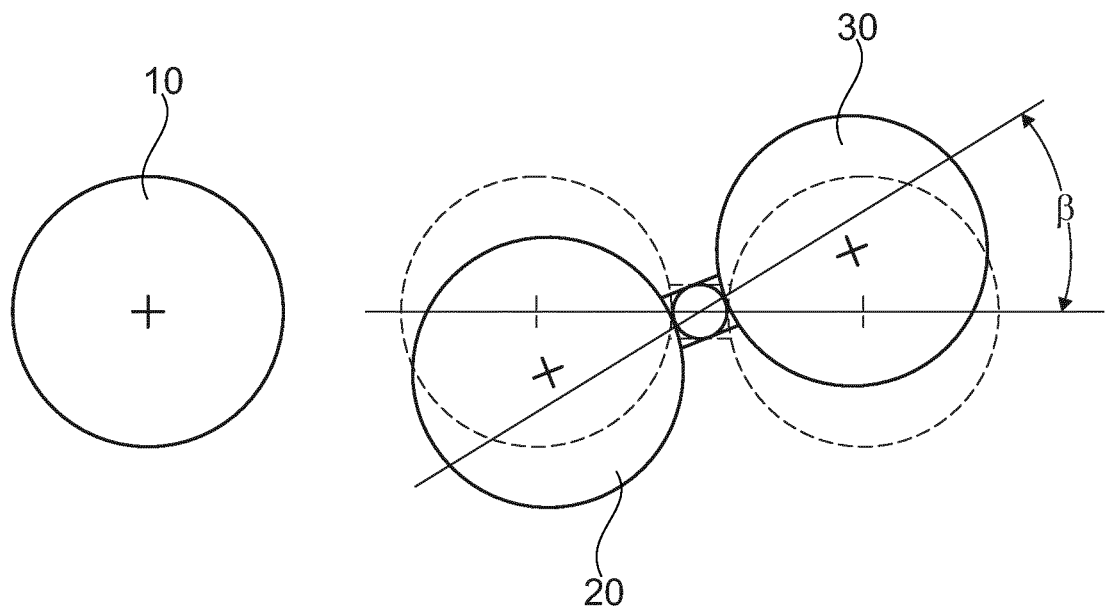
FIG. 4b shows the embodiment according to FIG. 4a indicating the movement of the tilting lever and the attached rear wheels.

Thus, as shown in FIG. 4b, the tilting lever 41 can rotate by any given value of the angle $\beta$, where $\beta=0$ when the wheels are horizontally aligned. The tilting lever 41 can for example be adapted to rotate up to 60° in either direction around the lever bearing 42, resulting in an overall rotation of up to 120°. In a preferred embodiment, the tilting lever 41 can rotate up to 55° in either direction. In another preferred embodiment, the tilting lever 41 can rotate up to 50° in either direction. In another preferred embodiment, the tilting lever 41 can rotate up to 45° in either direction. In another preferred embodiment, the tilting lever 41 can rotate up to 40° in either direction. In another preferred embodiment, the tilting lever 41 can rotate up to 35° in either direction. In another preferred embodiment, the tilting lever 41 can rotate up to 30° in either direction. In another preferred embodiment, the tilting lever 41 can rotate up to 25° in either direction. In another preferred embodiment, the tilting lever 41 can rotate up to 20° in either direction.

Figure 5A:
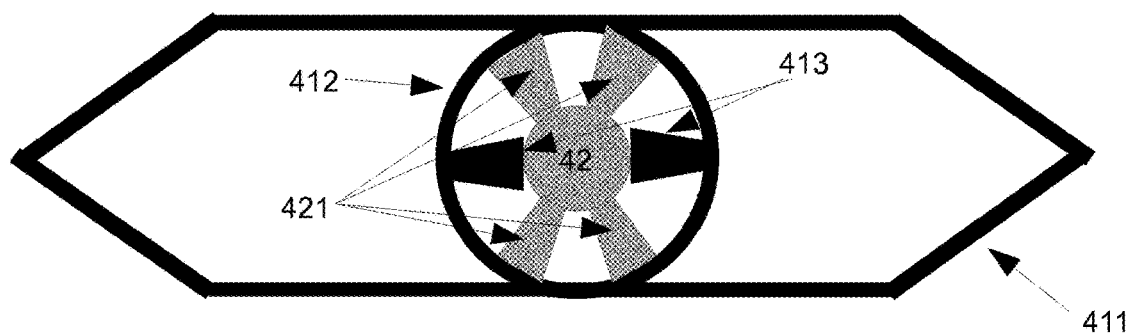
FIG. 5a shows a schematic embodiment of elements of the tilting lever in accordance with the present invention

FIG. 5a shows a schematic embodiment of the inside structure of the tilting lever 41. The tilting gear frame 411 can comprise different shapes as long as it provides adequate support and flexural strength to function as intended. The tilting gear frame 411 can be made from a metal and/or a metal alloy. The tilting gear 412 can be made of the same material as the tilting gear frame 411 and can comprise a part of it. The tilting gear teeth 413 can comprise a part of the tilting gear 412 and can also be made of the same material. In this way, the tilting gear frame 411, the tilting gear 412 and the tilting gear teeth 412 can all comprise one solid part of the tilting lever 41. Note that in the present embodiment, four tilting gear teeth 413 are shown, but there can be as well two tilting gear teeth covering a wider radius. The tilting axle 42 can be seen protruding from the center of the tilting gear 412. It can be fixed in this position by a mechanism not shown, or simply by the tilting gear teeth 413. The tilting axle 42 comprises tilting axle teeth 421 also fixed within the tilting gear 412. The tilting gear frame 411 is adapted to rotate around the tilting axle 42 along with the tilting axle teeth 421. The tilting gear teeth 413 can rotate freely along with the tilting gear frame 411 until they reach the tilting axle teeth 421. This is further shown in FIG. 5b.

Figure 5B:
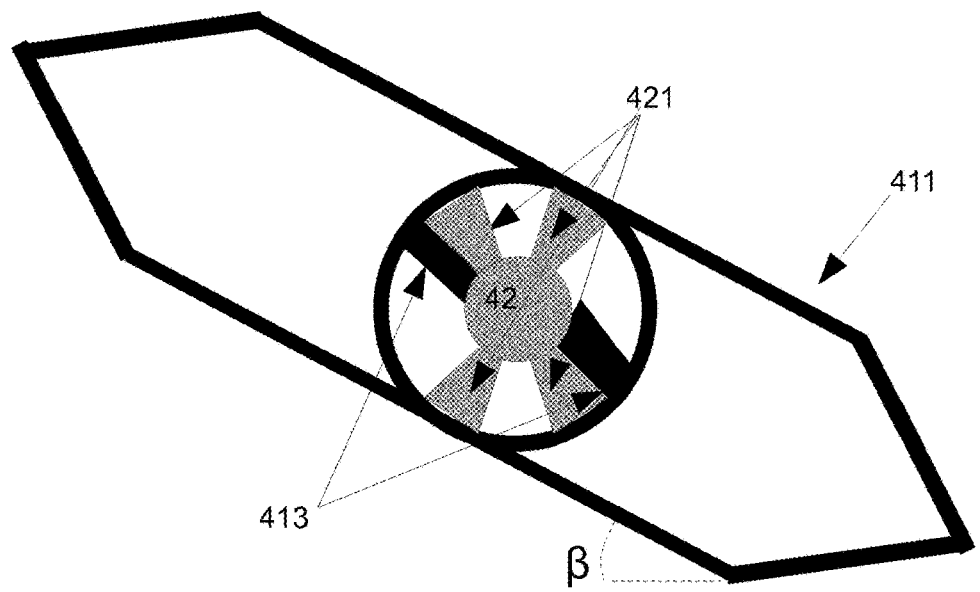

FIG. 5b demonstrates the same schematic embodiment of the inside structure of the tilting lever 41 as FIG. 5a rotated by an angle $\beta$. After such rotation, the tilting gear teeth 413 and the tilting axle teeth 421 are aligned and in contact. Any further rotation in the same direction can not be performed freely and would require actuating by the lever turn motor 49 (not shown here). A skilled person will understand that the angle $\beta$ can be variable and can depend on the desired application. For the mobile robot as described herein, this arrangement is beneficial, since smaller obstacles can be climbed without engaging the lever turn motor 49. In such a way, the robot can traverse irregularities on the sidewalk of a height such as 5 cm without engaging the lever turn motor 49. When traversing higher obstacles, such as curbstones of 15 cm or so, the robot can tilt the tilting lever freely 41 until the angle $\beta$ and then proceed with climbing by engaging the lever turn motor 49. The tilting lever 41 can for example be adapted to rotate freely for about 25°-45° from one engagement point all the way to the next, i.e. for about 12.5°-22.5° from a horizontal position to a maximally inclined position before engaging the motor. In a preferred embodiment, the robot can be adapted to engage the lever turn motor 49 past this point. A skilled person will also understand that the inclined embodiment shown in FIG. 5b can roughly correspond to the inclined embodiment shown in FIG. 4b.

Figure 5C:
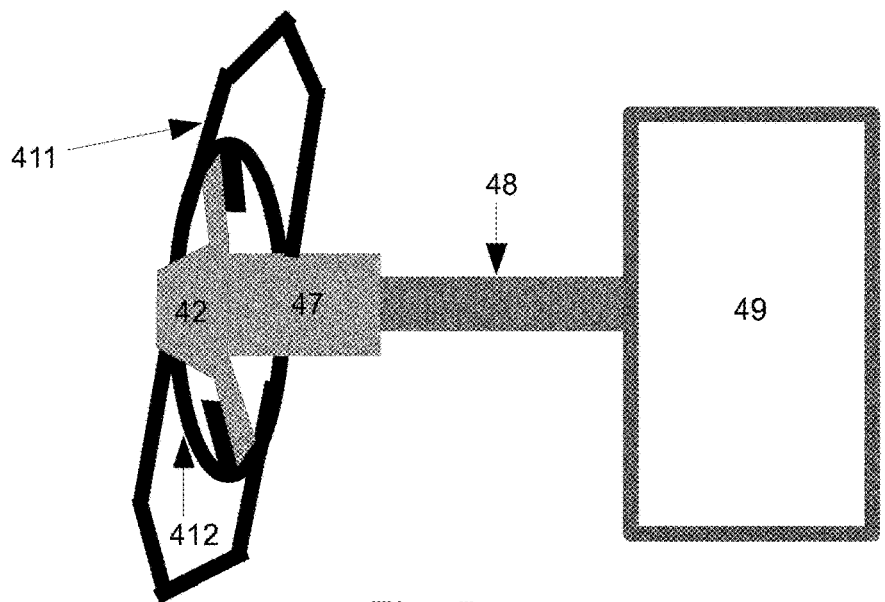
FIG. 5c shows an embodiment of elements of the tilting lever and lever turn motor according to the invention.

FIG. 5c demonstrates a side view of the schematic embodiment of the inside structure of the tilting lever 41 along with some further parts of the tilting mechanism. The tilting gear frame 411 is shown sideways along with the tilting gear 412. In this embodiment, the tilting axle 42 can be seen slightly protruding outward from the tilting gear 412. The lever turn mechanism 47 is shown schematically here and can comprise further gears, and/or pulleys. The lever turn shaft 48 connects to the lever turn motor 49 that is adapted to drive the tilting lever 41.

LIST OF REFERENCE NUMERALS

1—robot
2—body
3—lid
4—antenna
5—frame/carriage
10—front wheel
11—front axle
12—front motor
13—front wiring
14—front control
20—middle wheel
21—middle axle
30—rear wheel
31—rear axle
40—tilting assembly
41—tilting lever (tilting shaft)
42—lever bearing
43—lever shaft
44—rear motor
45—rear wiring
46—rear control
47—lever turn mechanism
48—lever turn shaft
49—lever turn motor
50—lever turn wiring
51—lever turn control

We claim:
1. A mobile robot comprising:
(a) a frame and at least one front wheel, at least two middle wheels and at least two rear wheels,

(b) wherein at least one middle wheel and at least one rear wheel are connected by a tilting lever arranged on each of opposing sides of or to the frame, forming a pair of wheels; and (c) wherein each tilting lever can be turned around a lever bearing located between respective axial centers of rotation of each pair of wheels, and further comprising at least one sensor constructed and adapted to sense at least one of: (i) an absolute angular position of the tilting lever, and/or (ii) a relative angular position of the tilting lever, wherein the at least one sensor adapted to sense the relative angular position of the tilting lever is calibrated at a beginning of operation, by calibrating the at least one sensor at an extreme position of the lever.

2. The robot of claim 1, wherein the tilting lever is adapted to rotate freely until a certain angle is reached, when the robot encounters uneven ground along its direction of movement, allowing the robot to traverse such uneven ground smoothly.

3. The robot of claim 1, wherein the tilting lever can be turned around the lever bearing by at most 60° on either side.

4. The robot of claim 3, wherein the tilting lever can be turned around the lever bearing by at least 55° on either side.

5. The robot of claim 3, wherein the tilting lever can be turned around the lever bearing by at least 50° on either side.

6. The robot of claim 3, wherein the tilting lever can be turned around the lever bearing by at between 45° and 20° on either side.

7. The robot of claim 1, wherein said at least one sensor comprises one or more of: a Hall effect non-contact rotary position sensor, a potentiometer, an optical encoder, a magnetic encoder, and/or at least one visual camera-like system.

8. The robot of claim 1, further comprising a lever turn motor adapted to start actuating the tilting lever upon receiving sensor data, said sensor data comprising data relating to one or more of: tilting angle, force applied to any of the wheels, visual data, Lidar data, and Hall effect non-contact rotation sensor data.

9. The robot of claim 1, wherein the robot is adapted to climb obstacles of up to 18 cm by rotating the tilting lever.

10. The robot of claim 1, wherein the tilting lever is adapted to rotate freely until a particular inclination angle is reached, at which point the lever turn motor is adapted to engage, such point being an engagement point.

11. The robot of claim 10, wherein the tilting lever is adapted to rotate freely over a range of 25°-45° from one engagement point to a next engagement point.

12. The robot of claim 1, further comprising at least one motor adapted to drive the wheels.

13. The robot of claim 12, comprising at least two motors adapted to drive the wheels.

14. The robot of claim 1, wherein the wheels are arranged on the frame such that the robot is supported by at least two wheels during normal travel along a surface.

15. The robot of claim 1, wherein the robot's center of mass is located between a middle and a front end of the robot.

16. The robot of claim 15, wherein the robot's center of mass is located between the middle and half of the distance from the middle to the front end of the robot.

17. A mobile robot comprising:

(a) a frame and at least one front wheel, at least two middle wheels and at least two rear wheels, (b) wherein at least one middle wheel and at least one rear wheel are connected by a tilting lever arranged on each of opposing sides of or to the frame, forming a pair of wheels; and (c) wherein each tilting lever can be turned around a lever bearing located between respective axial centers of rotation of each pair of wheels, wherein the wheels have the same radius and wherein a maximum distance d between the at least one front wheel and the at least one middle wheel or between the at least one middle wheel and the at least one rear wheel measured from a rear-most facing point of the at least one middle wheel is defined by:

$$d = \frac{6r^2 - 3h \cdot r}{2(h-r)},$$

where d is the said maximum distance, r is the radius of the wheels and h is the maximum traversable height of an obstacle.

18. A climbing method of a mobile robot, said robot comprising a frame with at least one front wheel, at least two middle wheels and at least two rear wheels, wherein at least one middle wheel and at least one rear wheel are connected by a tilting lever that is arranged on each of opposing sides of or to the frame, forming a pair of wheels, said method comprising:

(a) turning the tilting lever around a lever bearing located between respective axial centers of rotation of each pair of wheels when traversing an obstacle;

(b) engaging at least one lever turn motor once the tilting lever reaches a certain tilting angle;

(c) exerting a downward force on the middle wheels with a mechanism driven by the at least one lever turn motor so as to provide a counteracting vertical force on one or more front wheels and increase traction of the middle wheels, and to facilitate climbing of the front wheels;

(d) ceasing exerting the downward force on the one or more middle wheels after the front wheels have reached a top of the obstacle; and (e) completing climbing of the obstacle through forward momentum of the robot generated by actuating the middle and/or back wheels.

19. The method of claim 18, wherein the front, middle and back wheels are all actuated as the robot approaches the obstacle.

20. The method of claim 18, wherein the method further includes sensing a position of the front wheels on the obstacle before ceasing applying the downward force on the one or more middle wheels.

* * * * *